(12) United States Patent
Huang et al.

(10) Patent No.: US 11,732,370 B2
(45) Date of Patent: Aug. 22, 2023

(54) CORE-SHELL FE2P@C-FE3C ELECTROCATALYST AND PREPARATION METHOD AND APPLICATION THEREOF

(71) Applicant: SHAANXI UNIVERSITY OF SCIENCE & TECHNOLOGY, Shaanxi (CN)

(72) Inventors: Jianfeng Huang, Xi'an (CN); Xiao Zhang, Xi'an (CN); Liangliang Feng, Xi'an (CN); Liyun Cao, Xi'an (CN); Qianqian Liu, Xi'an (CN); Shuainan Li, Xi'an (CN); Danyang He, Xi'an (CN)

(73) Assignee: SHAANXI UNIVERSITY OF SCIENCE & TECHNOLOGY, Shaanxi (CN)

( * ) Notice: Subject to any disclaimer, the term of this patent is extended or adjusted under 35 U.S.C. 154(b) by 275 days.

(21) Appl. No.: 17/381,089

(22) Filed: Jul. 20, 2021

(65) Prior Publication Data

US 2022/0025533 A1  Jan. 27, 2022

(30) Foreign Application Priority Data

Jul. 23, 2020  (CN) .......................... 202010717347.3

(51) Int. Cl.
*H01M 8/04*   (2016.01)
*C25B 11/091* (2021.01)
*C25B 1/02*   (2006.01)
*C25B 11/065* (2021.01)
*H01M 4/90*   (2006.01)

(52) U.S. Cl.
CPC .............. *C25B 11/091* (2021.01); *C25B 1/02* (2013.01); *C25B 11/065* (2021.01); *H01M 4/9083* (2013.01)

(58) Field of Classification Search
CPC ....................................................... H01M 8/04
See application file for complete search history.

(56) References Cited

FOREIGN PATENT DOCUMENTS

CN    107651959 A    2/2018
CN    109244490 A    1/2019

OTHER PUBLICATIONS

Hu et al. ("Fe@Fe2P Core-Shell Nanorods Encapsulated in Nitrogen Doped Carbon Nanotubes as Robust and Stable Electrocatalyst Toward Hydrogen Evolution" Chem Electro Chem (IF 4.782); Published Jan. 10, 2019).*
Yang, K. et al., "Synthesis and Characteristics of $Fe_3C$ Nanoparticles Embedded in Amorphous Carbon Matrix," Chemical Research in Chinese Universities, vol. 26, No. 3, 2010, 4 pages.

* cited by examiner

*Primary Examiner* — Jacob B Marks
(74) *Attorney, Agent, or Firm* — Alleman Hall Creasman & Tuttle LLP (57) ABSTRACT

The present invention relates to a core-shell $Fe_2P@C$—$Fe_3C$ electrocatalyst and a preparation method and application thereof. The core-shell $Fe_2P@C$—$Fe_3C$ electrocatalyst comprises a carbon nanotube as a matrix which is formed by a carbon layer with $FeC_3$ nano-dots distributed therein, and $Fe_2P@C$ embedded in the carbon nanotube. The $Fe_2P@C$ has a core-shell structure and is formed by coating $Fe_2P$ with carbon.

10 Claims, 6 Drawing Sheets

CORE-SHELL FE2P@C-FE3C ELECTROCATALYST AND PREPARATION METHOD AND APPLICATION THEREOF

TECHNICAL FIELD

The invention relates to a preparation method and multifunctional application of a core-shell $Fe_2P@C$—$Fe_3C$ electrocatalyst, belonging to the technical field of electrochemistry.

BACKGROUND

With the rapid development of the global economy, humankind's demand for energy is increasing. The current energy structure mainly relies on fossil fuels such as oil, coal, and natural gas. Excessive exploitation and use have caused serious shortages of fossil fuels and environmental pollution. In order to change this situation, the development of green and sustainable new energy has become an inevitable choice for global economic development.

As a potential sustainable new energy development direction, converting the abundant water resources stored on the earth into products with higher value through electrochemical conversion has attracted extensive attention from scientific researchers. The development and utilization of this energy can realize an energy conversion system recycling $H_2O$, $H_2$, and $O_2$, and achieve real "zero emissions." As a new type of clean energy conversion system, hydrogen production by electrolysis of water, hydrogen fuel cells, and metal-air batteries have attracted widespread attention. In these conversion processes, the main reaction processes involved are oxygen evolution reactions, hydrogen evolution reactions (HERs), oxygen reduction reactions (ORRs), and so on. These reactions mainly rely on electrocatalysts to improve their chemical reaction rate, energy conversion efficiency, and product selectivity. At present, precious metals are used as high-efficiency electrocatalysts, but the expensive cost and scarce resources limit their wide application in the field of clean energy.

Transition metal carbides have excellent surface electronic structure and high conductivity, are more stable in strong acid or strong base electrolytes, and can be used as an efficient ORR electrocatalyst. Transition metal phosphides and carbides, having an electronic structure similar to Pt near the Fermi level, can significantly increase the HER electrocatalytic activity by adjusting the d electronic structure of the transition metal. Yang et al. used chemical vapor deposition (CVD) to prepare $Fe_3C$. Firstly, $Fe_4N$ was attached to a silicon plate, heated to 700° C. under a hydrogen atmosphere, and then methane gas was introduced, and different products were prepared by controlling the reaction time. However, when $Fe_3C$ is prepared by the CVD method, the reaction raw materials must be gaseous or liquid or solid substances which can be easily volatilized, limiting the application of CVD to prepare $Fe_3C$, and the reaction requires the use of catalysts, and the separation of the product and the catalyst is also difficult (Yang K Y, Xu W, Zhang Y, Synthesis and Characteristics of $Fe_3C$ Nanoparticles Embedded in Amorphous Carbon Matrix[J]. Chem Res Chin Univ, 2010, 26(3):348-351.). Patent application 1 (Chinese Publication CN107651959A) discloses a method for preparing ferric phosphide $Fe_2P$ under high temperature and high pressure, in which analytical reagents iron nano-powders and red phosphorous powders as starting materials were ground and mixed thoroughly with alcohol in an agate mortar; and a cylindrical sample from tablet processing was dried and put into a boron nitride tube; a high-temperature and high-pressure reaction was performed when the boron nitride tube was sealed; and after the reaction, the boron nitride outside the sample was removed to obtain block samples of pure iron phosphide. However, the synthesis method is complicated, and the red phosphorus in the raw material is easy to ignite spontaneously and is dangerous. In addition, patent application 2 (Chinese Publication CN109244490A) discloses a preparation method for iron carbide@nitrogen-doped carbon nanocatalyst. In this patent application, electrospinning technology was adopted to spin the prepared precursor solution into nanowires which were treated by heating to obtain iron carbide@nitrogen-doped carbon nanowire catalysts. The iron carbide@nitrogen-doped carbon nanowire catalyst prepared by the application is mainly used in the field of electrocatalytic oxygen reduction reactions. Therefore, the development of a low-cost, high-efficiency, and stable non-noble metal electrocatalyst has become an urgent problem in this field.

SUMMARY

In order to improve the electrocatalytic performance and find a multifunctional catalyst for hydrogen evolution, oxygen evolution, and oxygen reduction with superior performance to reduce costs as much as possible, the present invention provides a core-shell $Fe_2P@C$—$Fe_3C$ electrocatalyst and a preparation method thereof, which effectively improve the performance of the material in the field of electrocatalysis, processing broad application prospects.

In one aspect, the present invention provides a core-shell $Fe_2P@C$—$Fe_3C$ electrocatalyst, comprising, a carbon nanotube as a matrix which is formed by a carbon layer with $FeC_3$ nano-dots distributed therein, and $Fe_2P@C$ embedded in the carbon nanotube, wherein the $Fe_2P@C$ has a core-shell structure and is formed by coating $Fe_2P$ with carbon. The electrocatalyst provided by the present invention is a carbon nanotube structure formed by a carbon layer modified by $Fe_3C$ nanodots (carbon nanotubes modified by $Fe_3C$ nanodots), and a $Fe_2P@C$ core-shell structure formed by $Fe_2P$ coated by a carbon layer is grown in the nanotube. The electrocatalyst provided by the present invention, $Fe_2P$ covered by a carbon layer and growing in a carbon nanotube structure modified by $Fe_3C$ nanodots, has a large specific surface area, can fully contact with the electrolyte, and then can enhance its electrochemical performance. And this electrocatalyst, $Fe_2P$ covered by a carbon layer and growing in a carbon nanotube structure modified by $Fe_3C$ nanodots, also has good stability. This structure can maintain a complete structure under long-term testing, and the structure will not be destroyed.

Preferably, in the $Fe_2P@C$, a thickness of the C layer is 2.5 to 3.5 nm, and a particle size of $Fe_2P$ is 12 to 15 nm.

Preferably, in the structure of the present invention, the carbon nanotube modified by $Fe_3C$ nanodots has a diameter of 30 to 40 nm and a wall thickness of 4 to 6 nm. In addition, the length of the carbon nanotube in the electrocatalyst provided by the present invention may be 8 to m. The structure of such size is the best. If the experimental variables are changed, carbon nanotubes might not be formed, and other morphologies such as granular morphologies might be formed.

In the present invention, the atomic content of P of $Fe_2P$ covered by a C layer and growing in the inner surface of the nanotube is 2.07 at % in the electrocatalyst.

Preferably, a particle size of the $FeC_3$ nanodots is 4 to 6 nm.

In other aspect, the present invention provides a preparation method of the core-shell $Fe_2P@C$—$Fe_3C$ electrocatalyst, comprising:

(1) dissolving $FeCl_3 \cdot 6H_2O$, $C_2H_4N_4$ and F127 in a solvent (only for dispersing the solute, not limited to ethanol, water, other organic solvents are feasible) to form a mixed solution, and then removing the solvent by drying, to obtain a powder;

(2) Putting the powder and sodium hypophosphite separately in different places of a porcelain boat, and under a protective atmosphere, first heating them at 300 to 500° C. for 1 to 3 hours, and then heating them at 700 to 900° C. for 1 to 3 hours, to obtain the core-shell $Fe_2P@C$—$Fe_3C$ electrocatalyst.

In the present disclosure, the core-shell $Fe_2P@C$—$Fe_3C$ electrocatalyst is prepared by adopting a one-step sintering method.

Preferably, the solvent is ethanol, and the drying is performed at 60 to 80° C. for 6 to 8 hours.

Preferably, in the mixed solution, a mass concentration of $FeCl_3 \cdot 6H_2O$ is 0.005 to 0.03 g/ml, a mass concentration of $C_2H_4N_4$ is 0.04 to 0.12 g/ml, a mass concentration of F127 is 0.002 to 0.008 g/ml, and a mass ratio of $FeCl_3 \cdot 6H_2O$, $C_2H_4N_4$, and F127 is (0.5 to 1.5):(4 to 6):(0.2 to 0.4).

Preferably, a mass ratio of the powder and $NaH_2PO_2$ is (5 to 7):(4 to 6).

Preferably, the protective atmosphere is a mixed atmosphere of hydrogen and argon.

In another aspect, the present invention also provides an application of the above-mentioned core-shell $Fe_2P@C$—$Fe_3C$ electrocatalyst in hydrogen evolution reaction, oxygen evolution reaction, or oxygen reduction reaction.

Beneficial Effects (1) In the sample prepared by the present invention, $Fe_2P$ covered by a carbon layer grows in a carbon nanotube structure modified by $Fe_3C$ nanodots. This structure has a large specific surface area, can fully contact with the electrolyte, and then can enhance its electrochemical performance.

(2) The process is simple with cost greatly reduced, and it can be obtained by just one-step sintering.

(3) The method for preparing the catalyst is novel, and the product obtained has superior performance, which can be applied to various fields such as hydrogen evolution reactions, oxygen evolution reactions, oxygen reduction reactions, etc.

(4) The present invention develops and constructs a new type of high-efficiency and stable non-noble metal iron-based electrocatalyst, and can be applied in the field of electrochemical technology.

DETAILED DESCRIPTION

The present invention will be further described below through the following embodiments. It should be understood that the following embodiments are only used to illustrate the present invention, not to limit the present invention.

The invention provides a core-shell $Fe_2P@C$—$Fe_3C$ electrocatalyst with excellent functions of hydrogen evolution, oxygen evolution, and oxygen reduction, and a preparation method thereof. The core-shell $Fe_2P@C$—$Fe_3C$ electrocatalyst has excellent catalytic activity.

In the present invention, in order to improve the electrocatalytic performance, the microstructure of the material is designed and adjusted to expose more electrocatalytic active sites. In the core-shell $Fe_2P@C$—$Fe_3C$ electrocatalyst, a carbon layer modified by $Fe_3C$ nanodots forms a tubular structure, and the inner side (inside the tube) of the tubular structure is embedded with $Fe_2P@C$ of the core-shell structure. The $Fe_2P@C$ core-shell structure is formed by coating $Fe_2P$ with a C layer. In an optional embodiment, the thickness of the C layer in the core-shell structure $Fe_2P@C$ may be 2.5 to 3.5 nm, and the particle size of $Fe_2P$ may be 12 to 15 nm. As the active center of the electrocatalyst, $Fe_2P$ in the present invention plays a role in improving the catalytic activity. The C layer is used for the fixation of $Fe_2P$, providing good stability.

In addition, the electrocatalyst of the present invention also includes $Fe_3C$ nanodots (nanoparticles) embedded in the wall of the carbon nanotube. In an optional embodiment, the particle size of the $Fe_3C$ nanodots is 4 to 6 nm. The excellent electrical conductivity of carbon nanotubes and the large number of catalytic active sites exposed by ultra-fine $Fe_3C$ nanodots make the catalyst exhibit excellent electrocatalytic performance.

In the core-shell $Fe_2P@C$—$Fe_3C$ electrocatalyst provided by the present invention, the synthesis of $Fe_2P$ starts at about 300° C., so $Fe_2P$ is formed first, then the C layer is formed coating the $Fe_2P$ to form $Fe_2P@C$ with a core-shell structure. The synthesis of $Fe_3C$ starts at about 700° C., so the carbon nanotubes modified by $Fe_3C$ nanodots are finally formed and meanwhile encase the core-shell $Fe_2P@C$ to give the electrocatalyst structure of the present invention.

The invention adopts a one-step sintering method to prepare the core-shell $Fe_2P@C$—$Fe_3C$ electrocatalyst as described above. In the method of the present invention, (1) the raw materials $FeCl_3.6H_2O$, $C_2H_4N_4$, and F127 are completely dissolved in the solvent, and then the solvent is removed by drying, to obtain a uniformly mixed powder A; (2) the powder A is placed in a small porcelain boat which is then put in a downstream part of a large porcelain boat, $NaH_2PO_2$ is weighed and put into an upstream part of the large porcelain boat, and then a lid is put over the large porcelain boat. Then under a protective atmosphere, it was heated at 300 to 500° C. for 1 to 3 hours, and then at 700 to 700° C. for 1 to 3 hours, to obtain the core-shell $Fe_2P@C$—$Fe_3C$ electrocatalyst. There are different products decomposed from sodium hypophosphite when being heated, and the powder A mainly reacts with $PH_3$ (one of the decomposition products from sodium hypophosphite), so heating the materials at different places could make the required reaction take place smoothly, so as to obtain a final product of high purity. The following illustrates the preparation method of the core-shell $Fe_2P@C$—$Fe_3C$ electrocatalyst.

Ferric trichloride hexahydrate ($FeCl_3.6H_2O$), dicyandiamide ($C_2H_4N_4$) and polyoxyethylene polyoxypropylene copolymer (F127) (ferric trichloride hexahydrate ($FeCl_3.6H_2O$) as an iron source, dicyandiamide ($C_2H_4N_4$) as a carbon source, and polyoxyethylene polyoxypropylene copolymer (F127) as a morphology regulator) are weighed and dissolved in a solvent to obtain a mixed solution. The solvent can be ethanol, water, isopropanol, etc., and the addition amount can be 10 to 20 ml. The mass concentration of $FeCl_3.6H_2O$ in the mixed solution is (0.005 to 0.03) g/ml, the mass concentration of $C_2H_4N_4$ is (0.04 to 0.12) g/ml, and the mass concentration of F127 is (0.002 to 0.008) g/ml. Preferably, the mass ratio of $FeCl_3.6H_2O$, $C_2H_4N_4$, and F127 may be (0.5 to 1.5):(4 to 6):(0.2 to 0.4). During the dissolution process, magnetic stirring continues for 20 to 30 minutes at room temperature to facilitate mixing. In this step, the reaction raw materials are uniformly dissolved, and then solid-phase sintering is performed. If the solid raw materials are directly mixed and then solid-phase sintered, the reaction will be uneven, and produce agglomerated, large particles, and the formation of $Fe_2P$ and $Fe_3C$ will be hampered, resulting in a decrease in performance.

The mixed solution is put into an oven and dried at 60 to 80° C. for 6 to 8 hours to remove the solvent. After drying, grinding continues for 30 minutes to make the raw materials uniformly mixed, to give the powder A.

Powder A (0.5 to 1.5 g) and a certain amount of sodium hypophosphite ($NaH_2PO_2$) are weighed according to the mass ratio of m (powder A):m ($NaH_2PO_2$)=(5 to 7):(4 to 6). The powder A is put in a small porcelain boat which is then placed in a downstream part of a large porcelain boat, and $NaH_2PO_2$ is put into an upstream part of the large porcelain boat, and a lid is put over the large porcelain boat. A proper mass ratio between powder A and $NaH_2PO_2$ can make the resulted $Fe_2P$ and $Fe_3C$ achieve the best performance. If the amount of sodium hypophosphite increases, the advanced phosphating in the sample will consume more iron, and the production of $Fe_3C$ will decrease. If there is too much powder A, the carbon content will increase, which will affect the exposure of $Fe_2P$ and $Fe_3C$, and then affect the performance of the sample.

The porcelain boat filled with the sample is put into a low-temperature tube furnace, to which vacuuming and then inletting hydrogen and argon are performed 2 to 4 times alternately, so as to completely remove air from the tube. After that, both ends of the porcelain boat are heated for sintering under the protection of a hydrogen/argon atmosphere.

The sintering procedure includes: heating to 300 to 500° C. and holding for 1 to 3 hours, then heating to 700 to 900° C. and holding for 1 to 3 hours, and finally opening the low-temperature tube furnace and taking out the porcelain boat after being naturally cooled to room temperature. The sodium hypophosphite begins to decompose around 290 to 300° C. (wherein $2NaH_2PO_2=PH_3(g)+Na_2HPO_4$), and the first stage is kept at 300 to 500° C. to make the $PH_3$ produced by the decomposition of sodium hypophosphite react with $FeCl_3.6H_2O$ to form $Fe_2P$. The second stage is kept at 700 to 900° C. at which carbonization begins to form the $Fe_2P@C$ core-shell structure in which the $Fe_2P$ surface is coated with a carbon layer. Meanwhile, the carbon nanotubes are formed to encase the $Fe_2P@C$ core-shell structure. In addition, $FeCl_3.6H_2O$ and $C_2H_4N_4$ also begin to react to form stable $Fe_3C$ nanodots at around 650° C., inserting into the wall of the carbon nanotubes, and finally the core-shell $Fe_2P@C$—$Fe_3C$ electrocatalyst is obtained. Preferably, the heating rate of the first stage heating is 5 to 10° C./min. The heating rate of the second stage is 5 to 10° C./min.

The sample is taken out of the porcelain boat and put into a mortar for grinding into a fine powder sample to obtain the core-shell $Fe_2P@C$—$Fe_3C$ electrocatalyst.

Hereinafter, the present invention will be further described with the following examples. It should be understood that the following examples are used to explain this invention but do not mean to limit the scope of this invention. Any non-essential improvements and modifications made by a person skilled in the art based on this invention all fall into the protection scope of this invention. The specific process parameters below are only exemplary, and a person skilled in the art can choose proper values within an appropriate range according to the description, and are not restricted to the specific values shown below.

Example 1

(1) Ferric trichloride hexahydrate ($FeCl_3.6H_2O$), dicyandiamide ($C_2H_4N_4$), and polyoxyethylene polyoxypropylene copolymer (F127) were weighed and dissolved in 10 mL ethanol to obtain a mixed solution. The mass ratio of $FeCl_3 \cdot 6H_2O$, $C_2H_4N_4$, and F127 was controlled to be 0.5:4:0.2, and in the mixed solution, the mass concentration of $FeCl_3 \cdot 6H_2O$ was 0.01 g/mL, the mass concentration of $C_2H_4N_4$ was 0.008 g/mL, and the mass concentration of F127 was 0.004 g/mL. After being magnetically stirred at room temperature for 20 minutes, the mixed solution was dried at 60° C. in an oven for 6 hours, ground, and collected to obtain powder A.

(2) The powder A (0.5 g), and a certain amount of sodium hypophosphite ($NaH_2PO_2$) were weighed according to the mass ratio of m (powder A):m ($NaH_2PO_2$)=5:4. The powder A was put in a small porcelain boat which was then placed in a downstream part of a large porcelain boat, and the weighed $NaH_2PO_2$ was put into an upstream part of the large porcelain boat, and a lid was placed over the large porcelain boat.

(3) The porcelain boat filled with sample was put into a low-temperature tube furnace, to which vacuuming and then inletting hydrogen and argon are performed 2 times alternately so as to completely remove air from the tube. Both ends of the porcelain boat were heated for sintering under the protection of a hydrogen/argon atmosphere. It was heated at 3° C./min to 300° C. which was kept for 3 hours at first, then at 10° C./min to 700° C. which was kept for 3 hours. Finally, the low-temperature tube furnace was opened and the porcelain boat was taken out when the tube furnace was naturally cooled to room temperature.

(4) The sample was taken out of the porcelain boat and put into a mortar for grinding into a fine powder sample to obtain the core-shell $Fe_2P@C$—$Fe_3C$ electrocatalyst.

In this electrocatalyst, the thickness of the C layer in $Fe_2P@C$ is about 2.5 to 3.5 nm, and the particle size of $Fe_2P$ is about 12 to 15 nm. The content of P in the core-shell $Fe_2P@C$—$Fe_3C$ electrocatalyst is about 2.07 at %. The diameter of the carbon nanotubes modified with $Fe_3C$ nanodots is about 30 to 40 nm, the length is of the carbon nanotubes about 8 to 15 m, and the wall thickness of the carbon nanotubes is about 4 to 6 nm. The particle size of $Fe_3C$ nanodots is about 4 to 5 nm.

Example 2

(1) Ferric trichloride hexahydrate ($FeCl_3 \cdot 6H_2O$), dicyandiamide ($C_2H_4N_4$), and polyoxyethylene polyoxypropylene copolymer (F127) were weighed and dissolved in 15 mL ethanol to obtain a mixed solution. The mass ratio of $FeCl_3 \cdot 6H_2O$, $C_2H_4N_4$ and F127 was controlled to be 1:5:0.3, and in the mixed solution, the mass concentration of $FeCl_3 \cdot 6H_2O$ in the mixed solution was 0.013 g/mL, the mass concentration of $C_2H_4N_4$ was 0.067 g/mL, and the mass concentration of F127 was 0.004 g/mL. After being magnetically stirred at room temperature for 25 minutes, the mixed solution was dried at 70° C. in an oven for 7 hours, ground, and collected to obtain the powder A.

(2) The powder A (1 g), and a certain amount of sodium hypophosphite ($NaH_2PO_2$) were weighed according to the mass ratio of m (powder A):m ($NaH_2PO_2$)=6:5. The powder A was put in a small porcelain boat which was then placed in a downstream part of a large porcelain boat, and the weighed $NaH_2PO_2$ was put into an upstream part of the large porcelain boat, and then a lid was placed over the large porcelain boat.

(3) The porcelain boat filled with sample was put into a low-temperature tube furnace, to which vacuuming and then inletting hydrogen and argon are performed 3 times alternately so as to completely remove air from the tube. Both ends of the porcelain boat were heated for sintering under the protection of a hydrogen/argon atmosphere. It was heated at 3° C./min to 400° C. which was kept for 2 hours at first, then at 10° C./min to 800° C. which was kept for 2 hours. Finally, the low-temperature tube furnace was opened and the porcelain boat was taken out when the tube furnace was naturally cooled to room temperature.

(4) The sample was taken out of the porcelain boat and out into a mortar for grinding into a fine powder sample to obtain the core-shell $Fe_2P@C$—$Fe_3C$ electrocatalyst.

In this electrocatalyst, the thickness of the C layer in $Fe_2P@C$ is about 2.5 to 3.5 nm, and the particle size of $Fe_2P$ is about 12 to 15 nm. The content of P in the core-shell $Fe_2P@C$—$Fe_3C$ electrocatalyst is about 2.07 at %. The diameter of the carbon nanotubes modified with $Fe_3C$ nanodots is about 30 to 40 nm, the length of the carbon nanotubes is about 8 to 15 m, and the wall thickness of the carbon nanotubes is about 4 to 6 nm. The particle size of $Fe_3C$ nanodots is about 4 to 5 nm.

Table 1 shows the atomic ratio of each element in the electrocatalyst prepared in Example 2 determined at room-temperature:

| Element | C k | N k | O k | P k | Fe k |
|---|---|---|---|---|---|
| Atomic ratio/% | 29.24 | 35.95 | 32.36 | 2.07 | 0.39 |

Example 3

(1) Ferric trichloride hexahydrate ($FeCl_3 \cdot 6H_2O$), dicyandiamide ($C_2H_4N_4$), and polyoxyethylene polyoxypropylene copolymer (F127) and were weighed and dissolved in 15 mL ethanol to obtain a mixed solution. The mass ratio of $FeCl_3 \cdot 6H_2O$, $C_2H_4N_4$, and F127 was controlled to be 1.5:6:0.4, and in the mixed solution, the mass concentration of $FeCl_3 \cdot 6H_2O$ in the mixed solution was 0.015 g/mL, the mass concentration of $C_2H_4N_4$ was 0.06 g/mL, and the mass concentration of F127 was 0.004 g/mL. After being magnetically stirred at room temperature for 30 minutes, the mixed solution was dried at 80° C. in an oven for 8 hours, ground, and collected to obtain the powder A.

(2) The powder A (1.5 g), and a certain amount of sodium hypophosphite ($NaH_2PO_2$) were weighed according to the mass ratio of m (powder A):m ($NaH_2PO_2$)=7:6. The powder A was put in a small porcelain boat which was then placed it in a downstream part of a large porcelain boat, and the weighed $NaH_2PO_2$ was put into an upstream part of the large porcelain boat, and a lid was placed over the large porcelain boat.

(3) The porcelain boat filled with sample was put into a low-temperature tube furnace, to which vacuuming and then inletting hydrogen and argon are performed 4 times alternately so as to completely remove air from the tube. Both ends of the porcelain boat were heated for sintering under the protection of a hydrogen/argon atmosphere. It was heated at 3° C./min to 500° C. which was kept for 1 hour at first, then 10° C./min to 900° C. which was kept for 1 hour. Finally, the low-temperature tube furnace was opened and the porcelain boat was taken out when the tube furnace was naturally cooled to room temperature.

(4) The sample was taken out of the porcelain boat and put into a mortar for grinding into a fine powder sample to obtain the core-shell $Fe_2P@C$—$Fe_3C$ electrocatalyst.

In this electrocatalyst, the thickness of the C layer in $Fe_2P@C$ is about 2.5 to 3.5 nm, and the particle size of $Fe_2P$ is about 12 to 15 nm. The content of P in the core-shell $Fe_2P@C$—$Fe_3C$ electrocatalyst is about 2.07 at %. The diameter of the carbon nanotubes modified with $Fe_3C$ nanodots is about 30 to 40 nm, the length of the carbon nanotubes is about 8 to 15 m, and the wall thickness of the carbon nanotubes is about 4 to 6 nm. The particle size of $Fe_3C$ nanodots is about 4 to 5 nm.

Comparative Example 1

(1) Ferric trichloride hexahydrate ($FeCl_3 \cdot 6H_2O$), dicyandiamide ($C_2H_4N_4$) and polyoxyethylene polyoxypropylene copolymer (F127) were weighed and dissolved in 15 mL ethanol to obtain a mixed solution. The mass ratio of $FeCl_3 \cdot 6H_2O$, $C_2H_4N_4$, and F127 was controlled to be 1:5:0.3, and in the mixed solution, the mass concentration of $FeCl_3 \cdot 6H_2O$ in the mixed solution was 0.013 g/mL, the mass concentration of $C_2H_4N_4$ was 0.067 g/mL, and the mass concentration of F127 was 0.004 g/mL. After being magnetically stirred at room temperature for 25 minutes, the mixed solution was dried at 70° C. in an oven for 7 hours, ground, and collected to obtain the powder A.

(2) The powder A (1 g), and a certain amount of sodium hypophosphite ($NaH_2PO_2$) were weighed according to the mass ratio of m (powder A):m ($NaH_2PO_2$)=6:5, mixed directly and put into a porcelain boat, and then a lid was placed over the porcelain boat.

(3) The porcelain boat filled with sample was put into a low-temperature tube furnace, to which vacuuming and then inletting hydrogen and argon are performed 3 times alternately so as to completely remove air from the tube. Both ends of the porcelain boat were heated for sintering under the protection of a hydrogen/argon atmosphere. It was heated at 3° C./min to 400° C. which was kept for 2 hours at first, then was heated at 10° C./min to 800° C. which was kept for 2 hours. Finally the low-temperature tube furnace was opened and the porcelain boat was taken out when the tube furnace was naturally cooled to room temperature.

(4) The sample was taken out of the porcelain boat and put into a mortar for grinding into a fine powder sample to obtain the sample of Comparative Example.

Figure 1:
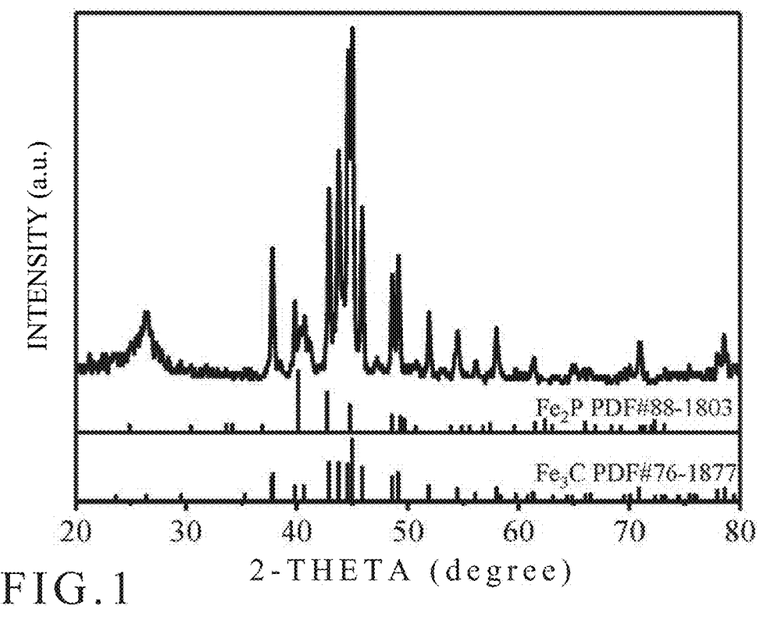
FIG. 1 shows an X-ray diffraction (XRD) pattern of the electrocatalyst prepared in Example 2, from which it can be seen that $Fe_3C$ and $Fe_2P$ have been successfully prepared.
Figure 2:
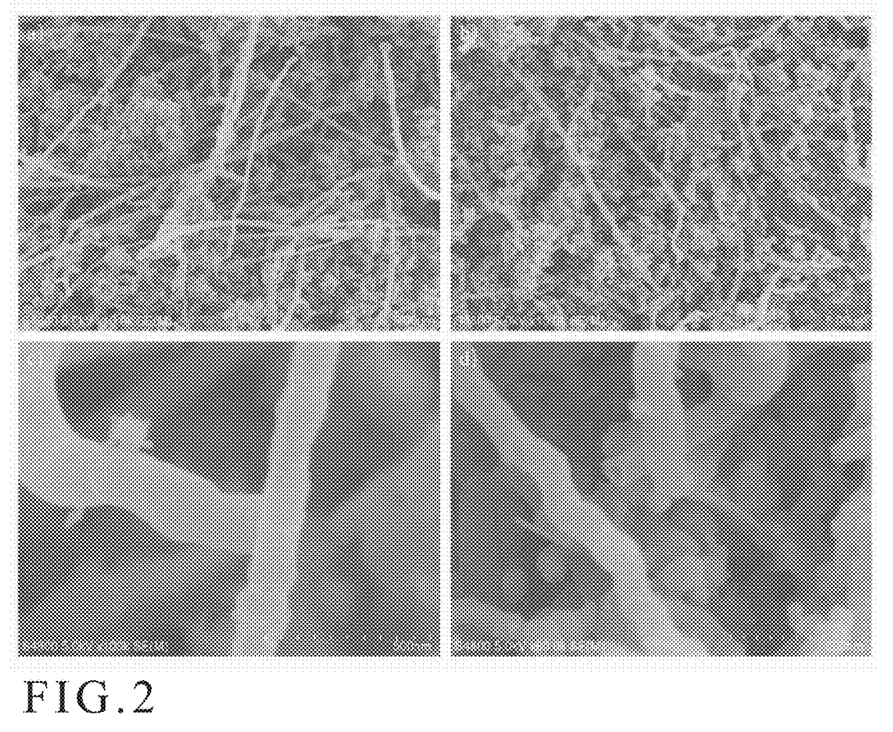
FIG. 2 shows low power scanning electron microscope (SEM) images (a) and (b) and high power scanning electron microscope (SEM) images (c) and (d) of the electrocatalyst prepared in Example 2, from which it can be seen that the nanotube samples have been successfully prepared. The size distribution of carbon nanotubes can be estimated from the SEM images, and the diameter of carbon nanotubes modified by $Fe_3C$ nanodots is about 30 to 40 nm, which is beneficial to increase the specific surface area of the samples, improving its electrocatalytic performance.
Figure 3:
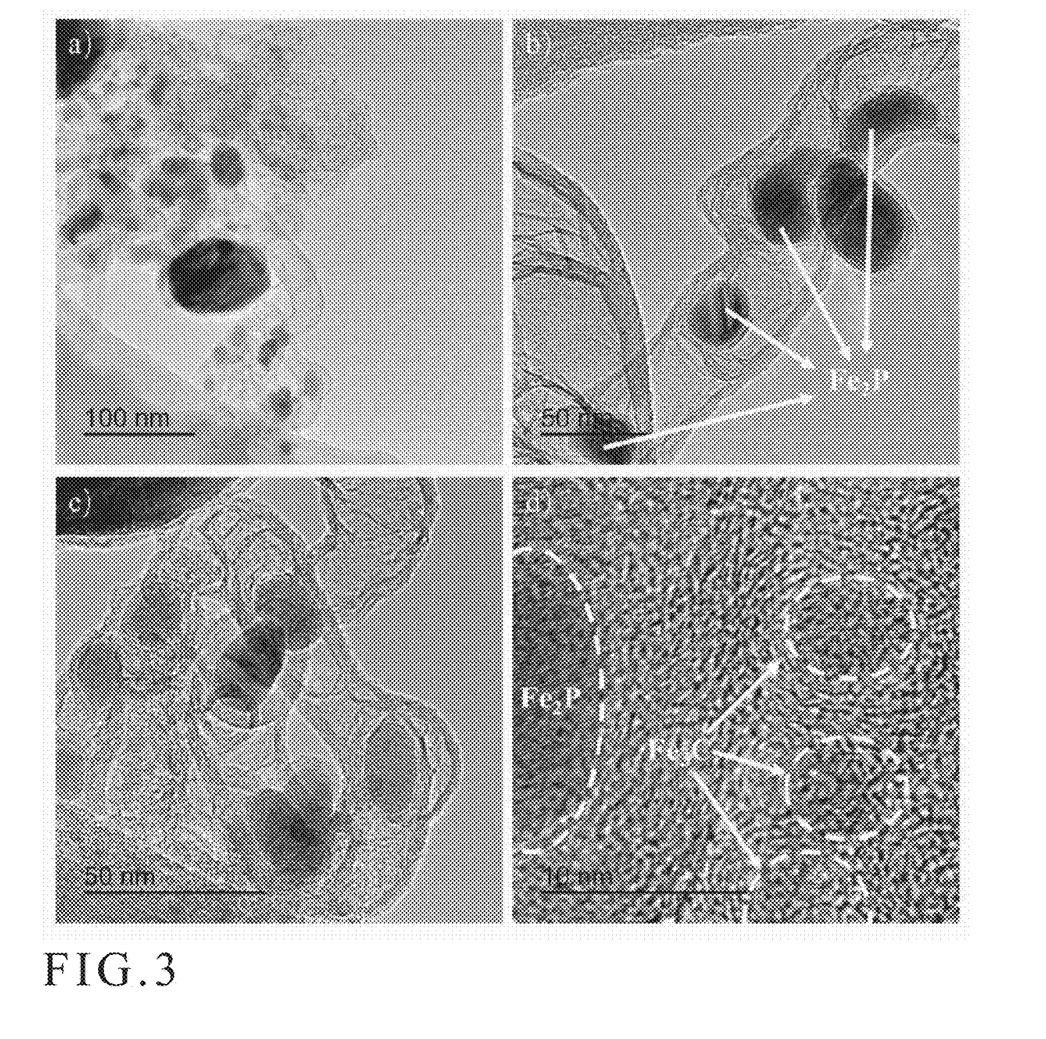
FIG. 3 shows transmission electron microscope (TEM) images of the electrocatalyst prepared in Example 2 under different magnifications, from which it can be seen that $Fe_3C$ nanodots are embedded in the wall of carbon nanotubes, and $Fe_2P@C$ particles with core-shell structure are dispersed inside the carbon nanotubes. The thickness of a C layer in $Fe_2P@C$ measured from FIG. 3 image b is about 2.5 to 3.5 nm, and the particle size of $Fe_2P$ is about 12 to 15 nm. The diameter of the nanotube modified by $Fe_3C$ nanodots is about 30 to 40 nm, and the wall thickness of the nanotube is about 4 to 6 nm. The diameter of $Fe_3C$ nanodots is about 4 to 6 nm measured by from FIG. 3 image d.
Figure 4:
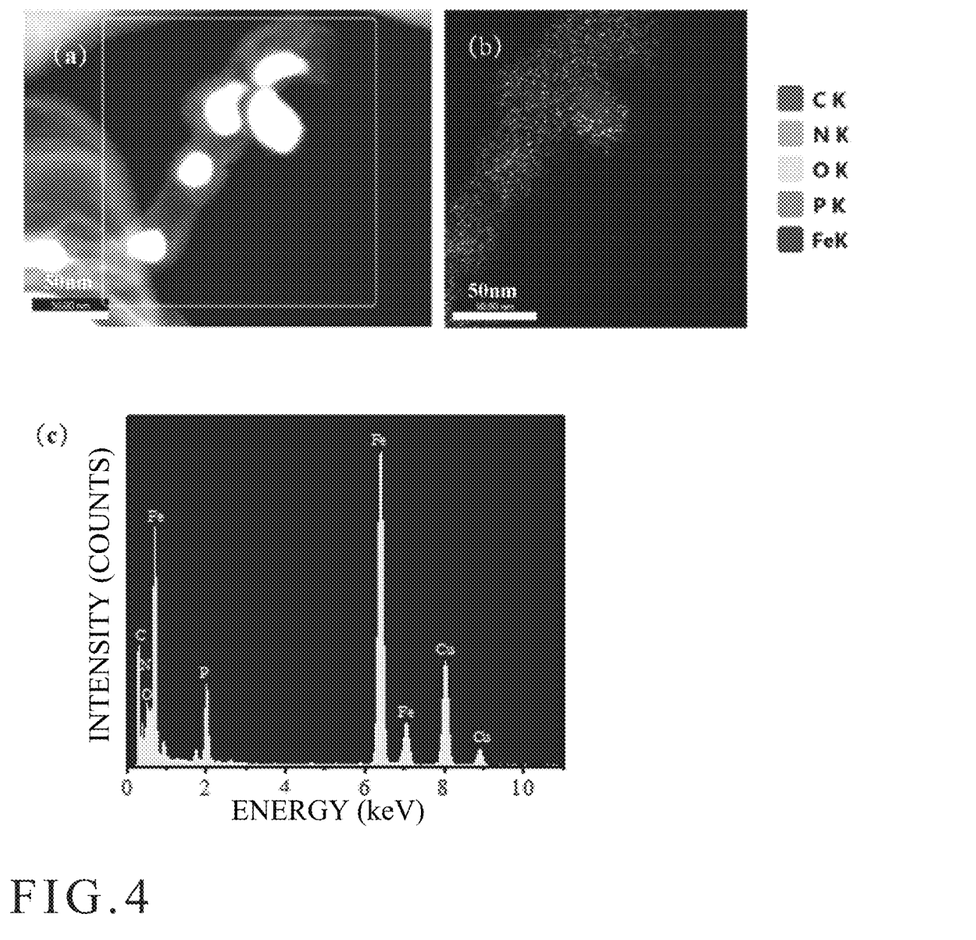
FIG. 4 shows an EDX diagram of the catalyst prepared in Example 2, from which it can be seen that the atomic content of P of $Fe_2P$ coated by a carbon layer and growing in the inner surface of the nanotube is 2.07 at % in the electrocatalyst.
Figure 5:
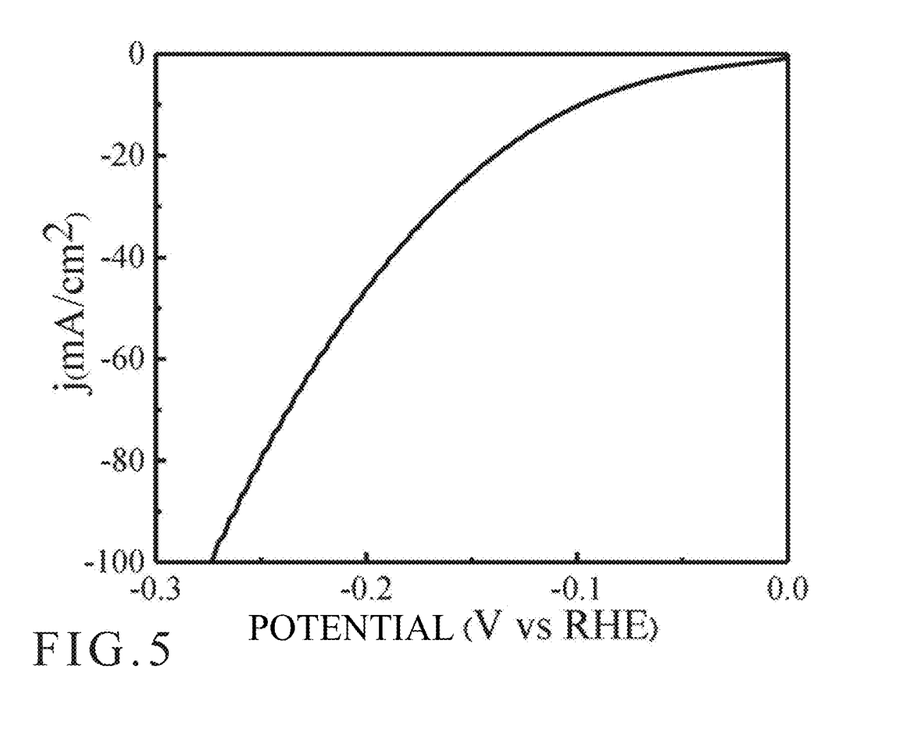
FIG. 5 shows a linear sweep voltammetry (LSV) performance test diagram of the electrocatalyst prepared in Example 2 for hydrogen evolution reaction under 1.0M KOH, from which it can be seen that the overpotential is about 99 mV under a current density of 10 mA/cm$^2$, showing excellent hydrogen evolution performance.
Figure 6:
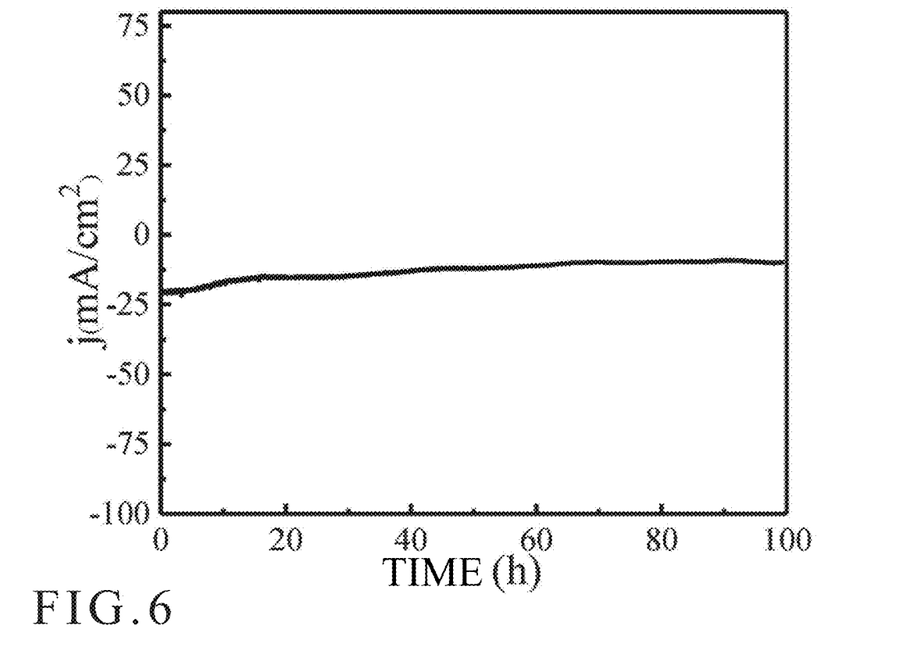
FIG. 6 shows a potentiostatic polarization (i-t) performance test diagram of the electrocatalyst prepared in Example 2 for hydrogen evolution reaction under 1.0M KOH, from which it can be seen that the sample of the present invention maintains the stability of 100 hours at a current density of 15 mA/cm$^2$, showing excellent stability.
Figure 7:
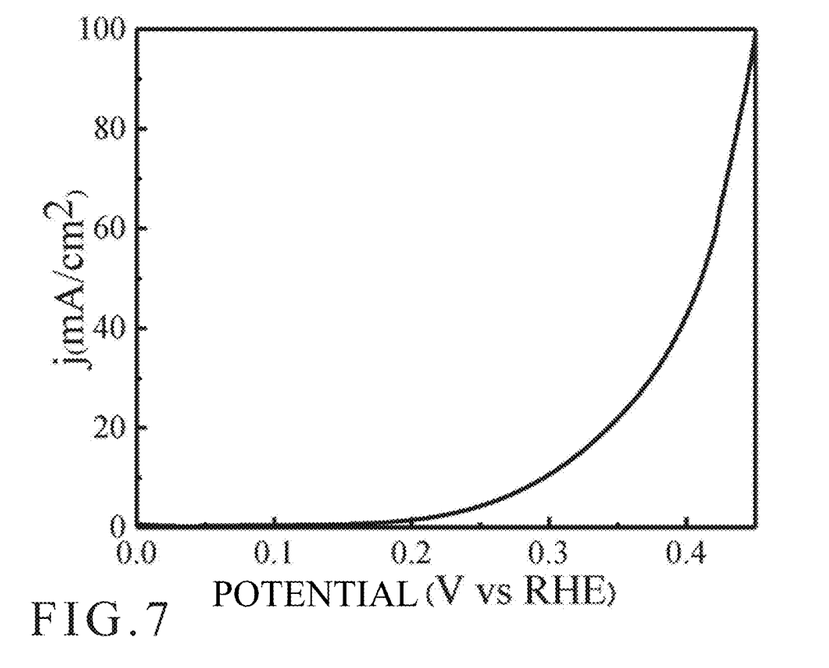
FIG. 7 shows a linear scanning voltammetry (LSV) performance test diagram of the electrocatalyst prepared in Example 2 for oxygen evolution reaction under 1.0M KOH, from which it can be seen that the overpotential is about 297 under a current density of 10 mA/cm$^2$, showing excellent oxygen evolution performance.
Figure 8:
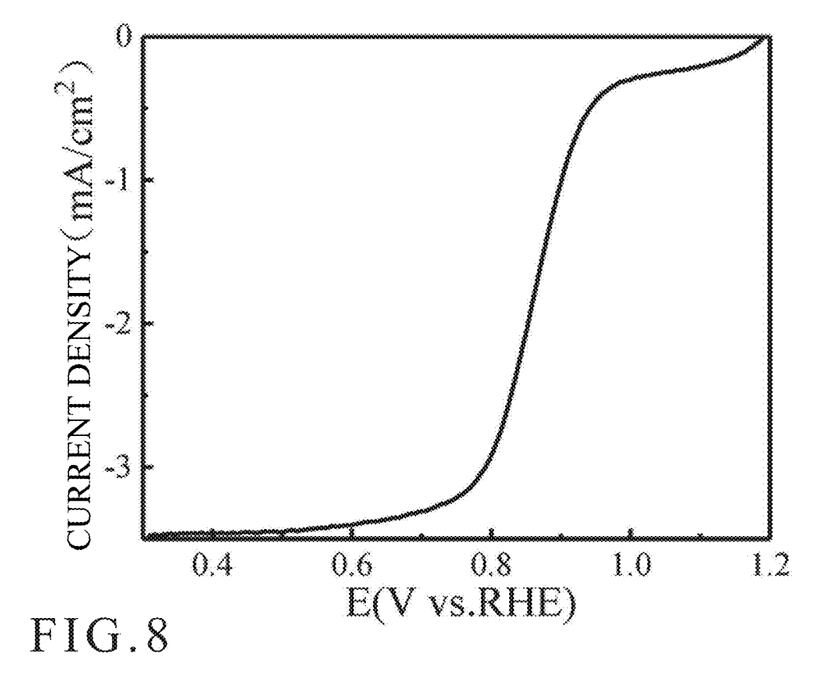
FIG. 8 shows the linear scanning voltammetry (LSV) performance test diagram of the electrocatalyst prepared in Example 2 for the oxygen reduction reaction, from which it can be seen that the half-wave potential is about 0.86 V at a speed of 1600 rpm, showing excellent oxygen reduction performance.
Figure 9:
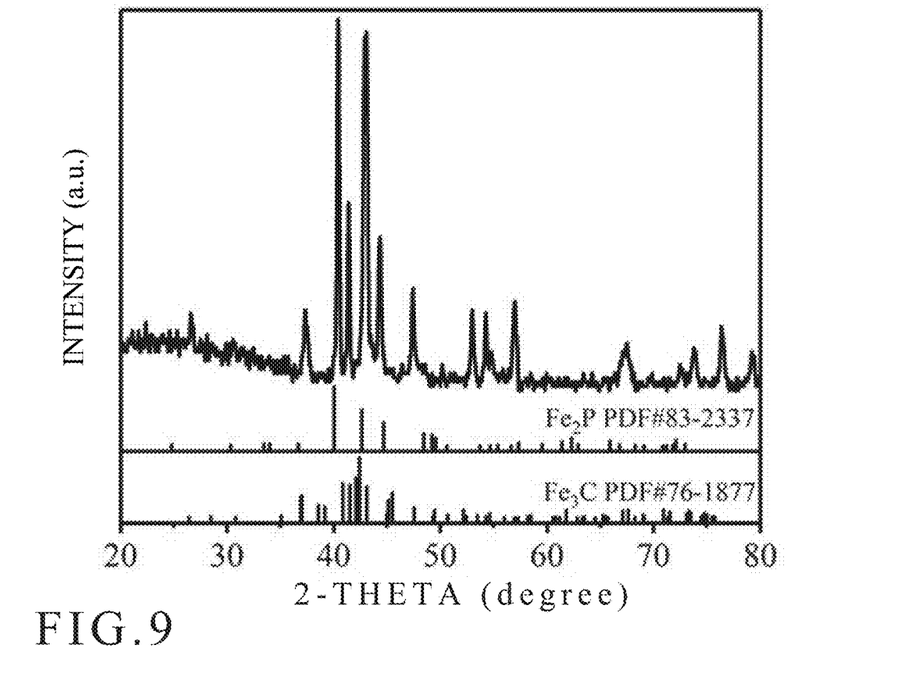
FIG. 9 shows an X-ray diffraction (XRD) pattern of the electrocatalyst prepared in Comparative Example 1 from which it can be seen that the diffraction peak intensity of $Fe_2P$ is higher, and the diffraction peak intensity of $Fe_3C$ becomes weaker.
Figure 10:
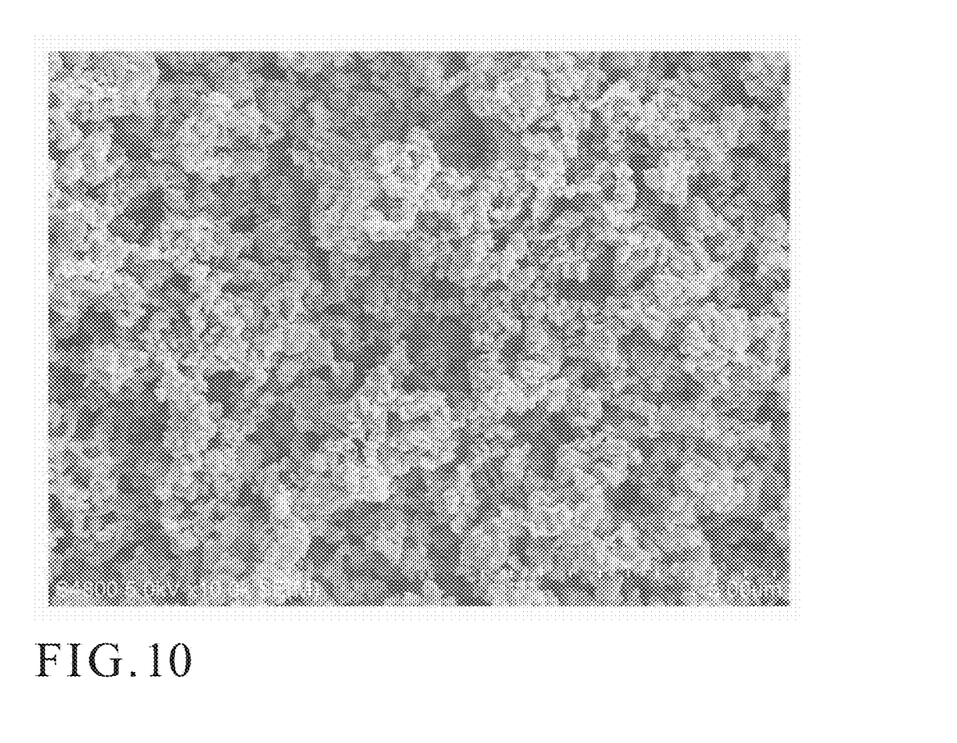
FIG. 10 shows a low power scanning electron microscope (SEM) image of the electrocatalyst prepared in Comparative Example 1, it can be seen from the figure that there are only particles and block morphologies, and no carbon nanotube is formed.

From the X-ray diffraction (XRD) pattern of the electrocatalyst prepared in Comparative Example 1, it can be seen that the diffraction peak intensity of $Fe_2P$ is higher, and the diffraction peak intensity of $Fe_3C$ becomes weaker. From the low power scanning electron microscope (SEM) image of the electrocatalyst prepared in Comparative Example 1, it can be seen that there are only particles and block morphologies, and no carbon nanotube is formed. In addition, in the process of preparing the sample, since the materials are heated at different places, the contamination of the sample by the decomposition products of sodium hypophosphite can be avoided. Therefore, there is no need to remove impurities in subsequent steps, and the product can be collected directly Accordingly, the implementation of the experiment is more reasonable and simpler than the comparative experiment, and is easier to implement.

The invention claimed is:

1. A core-shell $Fe_2P@C$—$Fe_3C$ electrocatalyst, comprising:
   a carbon nanotube as a matrix which is formed by a carbon layer with $FeC_3$ nanodots distributed therein; and
   $Fe_2P@C$ embedded in the carbon nanotube,
   wherein the $Fe_2P@C$ has a core-shell structure and is formed by coating $Fe_2P$ with a C layer.

2. The core-shell $Fe_2P@C$—$Fe_3C$ electrocatalyst of claim 1, wherein in the $Fe_2P@C$, a thickness of the C layer is 2.5 to 3.5 nm, and a particle size of the $Fe_2P$ is 12 to 15 nm.

3. The core-shell $Fe_2P@C$—$Fe_3C$ electrocatalyst of claim 1, wherein a diameter of the carbon nanotube is 30 to 40 nm, and a wall thickness of the carbon nanotube is 4 to 6 nm.

4. The core-shell $Fe_2P@C$—$Fe_3C$ electrocatalyst of claim 1, wherein a particle size of the $FeC_3$ nanodots is 4 to 6 nm.

5. The core-shell $Fe_2P@C$—$Fe_3C$ electrocatalyst of claim 1, wherein the content of P in the core-shell $Fe_2P@C$—$Fe_3C$ electrocatalyst is 2.07 at %.

6. A preparation method of the core-shell $Fe_2P@C$—$Fe_3C$ electrocatalyst of claim 1, comprising:
   (1) dissolving $FeCl_3 \cdot 6H_2O$, $C_2H_4N_4$, and F127 in a solvent to form a mixed solution, and then removing the solvent by drying, to obtain a powder;
   (2) putting the powder and sodium hypophosphite separately in different places of a porcelain boat, and under a protective atmosphere, first heating them at 300 to 500° C. for 1 to 3 hours, and then heating them at 700 to 900° C. for 1 to 3 hours, to obtain the core-shell $Fe_2P@C$—$Fe_3C$ electrocatalyst.

7. The preparation method of claim 6,
   wherein in the mixed solution, a mass concentration of $FeCl_3 \cdot 6H_2O$ is 0.005 to 0.03 g/mL, a mass concentration of $C_2H_4N_4$ is 0.04 to 0.12 g/mL, and a mass concentration of F127 is 0.002 to 0.008 g/mL, and
   wherein a mass ratio of $FeCl_3 \cdot 6H_2O$, $C_2H_4N_4$, and F127 is (0.5 to 1.5):(4 to 6):(0.2 to 0.4).

8. The preparation method of claim 6, wherein a mass ratio of the powder and the sodium hypophosphite is (5 to 7):(4 to 6).

9. The preparation method of claim 6, wherein the protective atmosphere is a mixed atmosphere of hydrogen and argon.

10. A use of the core-shell $Fe_2P@C$—$Fe_3C$ electrocatalyst of claim 1 in a hydrogen evolution reaction, an oxygen evolution reaction, or an oxygen reduction reaction.

* * * * *